Figure 1:
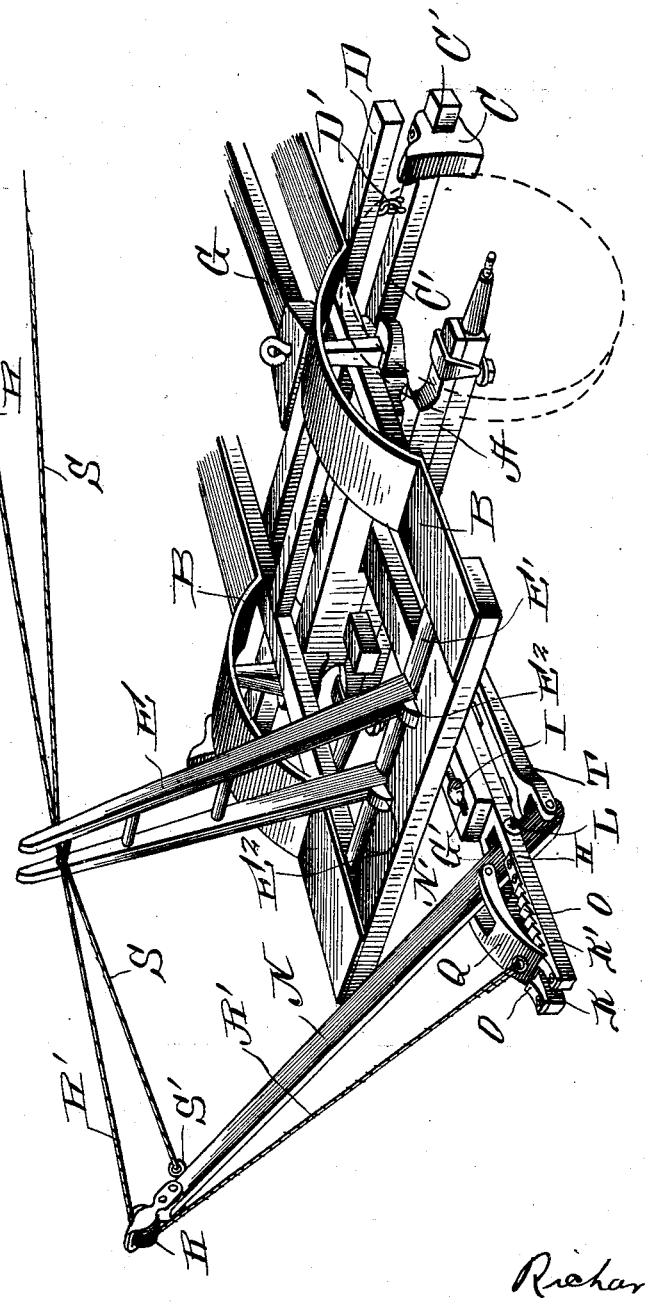

R. E. BERRY.
BRAKE ATTACHMENT FOR HAY WAGONS, &c.
APPLICATION FILED JUNE 24, 1908.

902,549.

Patented Nov. 3, 1908.
2 SHEETS—SHEET 1.

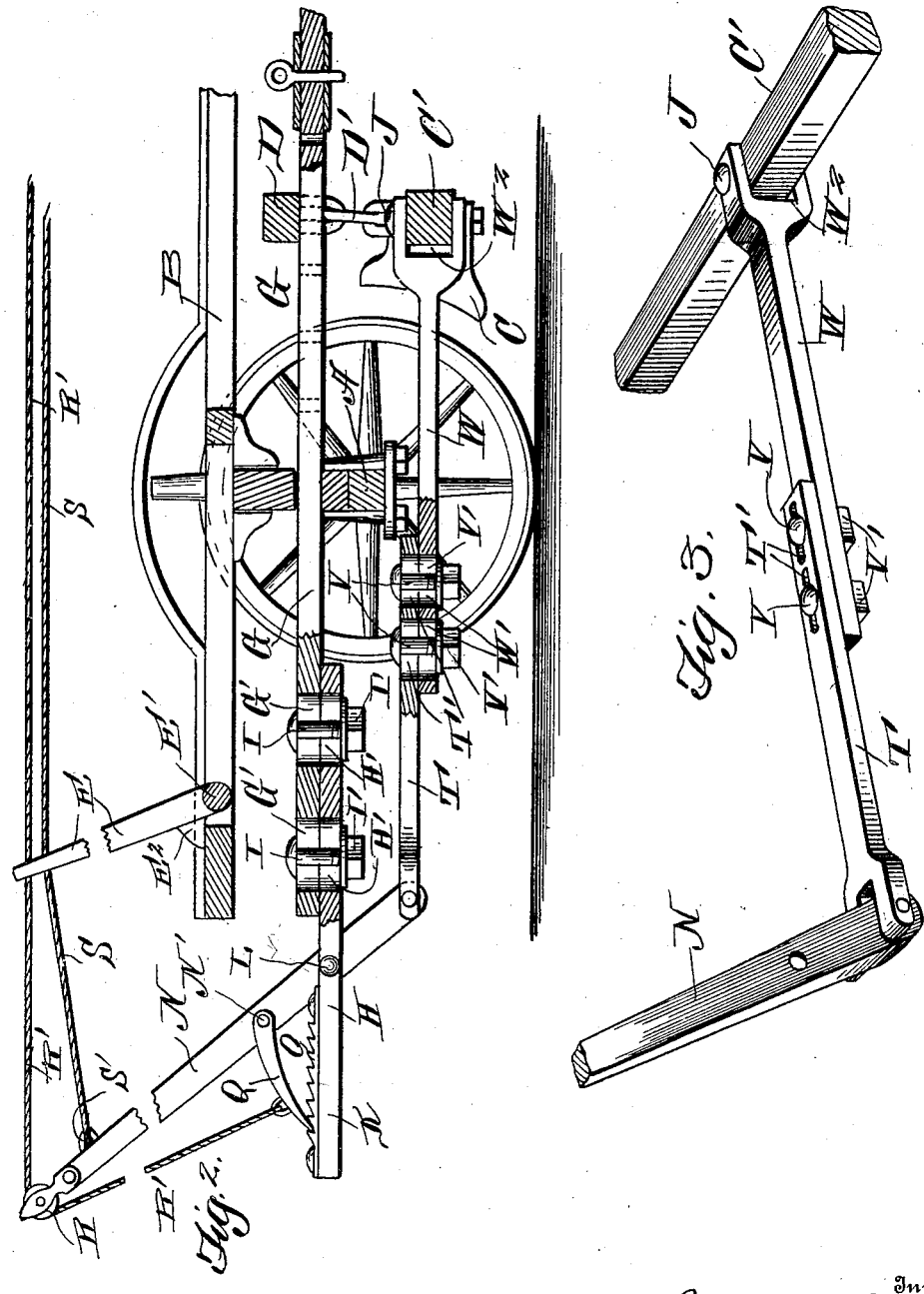

UNITED STATES PATENT OFFICE.

RICHARD E. BERRY, OF ASHGROVE, VIRGINIA, ASSIGNOR OF ONE-HALF TO DALLAS BERRY, OF ASHGROVE, VIRGINIA.

BRAKE ATTACHMENT FOR HAY-WAGONS, &c.

No. 902,549.

Specification of Letters Patent.

Patented Nov. 3, 1908.

Application filed June 24, 1908. Serial No. 440,140.

*To all whom it may concern:*

Be it known that I, RICHARD E. BERRY, a citizen of the United States, residing at Ashgrove, in the county of Fairfax and State of Virginia, have invented certain new and useful Improvements in Brake Attachments for Hay-Wagons, &c.; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments for brake apparatus especially designed for use in connection with hay wagons, etc., and comprises a simple and efficient means whereby a brake may be conveniently adjusted to the running gear of wagons and made adjustable to fit different makes of wagons.

More specifically, the invention comprises an adjustable attachment to the reach of a wagon and so arranged that a brake upon the wagon may be set and held in such position by mechanism operated at an elevation above the platform of the hay rack or wagon.

The invention comprises various details of construction, combinations and arrangements of parts which will be hereinafter fully described and then specifically defined in the appended claims.

I illustrate my invention in the accompanying drawings, in which:—

Figure 1 is a perspective view of a portion of a hay wagon showing my improved brake operating apparatus as applied thereto. Fig. 2 is a longitudinal section through the wagon, parts being shown in elevation, and Fig. 3 is an enlarged detail perspective view of an adjustable connection between the pivotal lever and brake bar.

Reference now being had to the details of the drawings by letter, A designates the rear axle of a wagon and B a rack mounted upon the bolster upon said axle and is provided with the brake shoes C mounted upon the bar C', which bar in the present instance is shown as suspended by means of a chain D' from the bar D.

E designates a hay ladder of the usual construction mounted upon the rotatable shaft E' journaled in the hay rack and E² designate stops which project from the hay ladder and adapted to contact with the upper surface of the cross-piece at the rear end of the rack in the manner shown in Figs. 1 and 2 of the drawings, whereby the rearward throw of said ladder may be limited.

G designates a reach section which projects rearward from the axle A and is provided with slots G', shown clearly in Fig. 2 of the drawings, said reach section being supported upon the axle in the usual manner.

H designates an adjustable lever carrying bar having slots H' therein, and I designates bolts which pass through registering slots G' and H' and nuts I' upon said bolts are provided for the purpose of holding the reach section G and the adjustable bar H in adjusted positions. The outer end of the bar H is slotted, as at K, shown clearly in Fig. 1 of the drawings, and mounted in registering apertures in the arms K', between which said slot is formed, is a pivotal pin L upon which the lever N is mounted. Upon each of said arms is a ratchet bar O having teeth adapted to be engaged by the pawl Q which has a forked end, the arms of which are pivotally mounted upon a pin N' carried by the lever N. The upper end of the lever N has a pulley R fixed thereto, and R' designates a cord fastened to one end of the pawl Q thence passes about the pulley R and extends forward over the upper round of the hay ladder E and extends to any convenient location where it may be within the reach of an operator upon a load of hay or grain. A second cord or rope, designated by letter S, is fastened to an eye S' upon the lever N and also passes over the top of the top round of the ladder E and within convenient reach of the person upon the load of hay.

Pivotally connected to the lower end of the lever N is a forked bar T, shown clearly in the drawings, and said bar T has elongated slots T' therein. W designates a bar which is also provided with elongated slots W', shown clearly in Fig. 2 of the drawings, and bolts V pass through registering slots T' and W' and nuts V' upon said bolts V and serve to hold the two bars T and W in adjusted positions. The forward end of the bar W has a forked end W², and J designates a bolt passing through the arms at the end of the bar W and also through the brake bar C'.

The operation of my brake apparatus is as follows:—When it is desired to apply the brake, it may be done by the operator pulling upon the rope S, causing the bars T and W to draw the brake shoes, which are upon the bar C′, against the rear wheels of the vehicle. As the lever N tilts upon its pivot, the pawl carried thereby will automatically engage and hold the purchase and the brake set. When it is desired to release the brake, it may be accomplished by the operator pulling upon the rope S until the pawl Q is free from the ratchet teeth engaged thereby, after which, by pulling upon the cord R, the pawl may be held from engagement with the ratchet teeth and the lever is allowed to swing down by gravity rearward from the end of the wagon.

By the provision of the adjusting means, it will be readily observed that the apparatus may be regulated to vary the throw of the brake and may be readily applied to various forms of running gears to wagons.

What I claim to be new is:—

1. A brake attachment for hay wagons, etc., comprising, in combination with a running gear having a brake bar, an extension bar adjustably connected to the reach section, a lever pivotally mounted upon said extension bar, and connections between the lever and the brake bar of the running gear, as set forth.

2. A brake attachment for hay wagons, etc., comprising, in combination with a running gear having a brake bar, an extension bar adjustably connected to the reach section, a lever pivotally mounted upon said extension bar, and adjustable connections between the lever and the brake bar, as set forth.

3. A brake attachment for hay wagons, etc., comprising, in combination with a running gear having a brake bar, an extension bar adjustably connected to the reach section, a lever pivotally mounted upon said extension bar, a forked bar pivotally connected to said lever and having slots therein, a second forked bar connected to the brake bar of the wagon and having slots which are in registration with the slots in said bar which is fastened to the lever, and bolts adjustably held in said registering slots, as set forth.

4. A brake attachment for hay wagons, etc., comprising, in combination with a running gear having a brake bar, an extension bar adjustably connected to the reach section, a lever pivotally mounted upon said extension bar, adjustable connections between the lever and the brake bar, a hay ladder upon the wagon, and a rope secured to said lever and passing over said hay ladder, as set forth.

5. A brake attachment for hay wagons, etc., comprising, in combination with a running gear having a brake bar, an extension bar adjustably connected to the reach section, a lever pivotally mounted upon said extension bar, adjustable connections between the lever and the brake bar, a hay ladder upon the wagon, a rope secured to said lever and passing over said hay ladder, a ratchet tooth upon said extension bar, a pawl carried by said lever and engaging said tooth, a cord secured to said pawl, and a pulley upon the lever and over which said cord passes, as set forth.

In testimony whereof I hereunto affix my signature in presence of two witnesses.

RICHARD E. BERRY.

Witnesses:
A. L. HOUGH,
ROBERT A. BOSWELL.